Patented Jan. 7, 1936

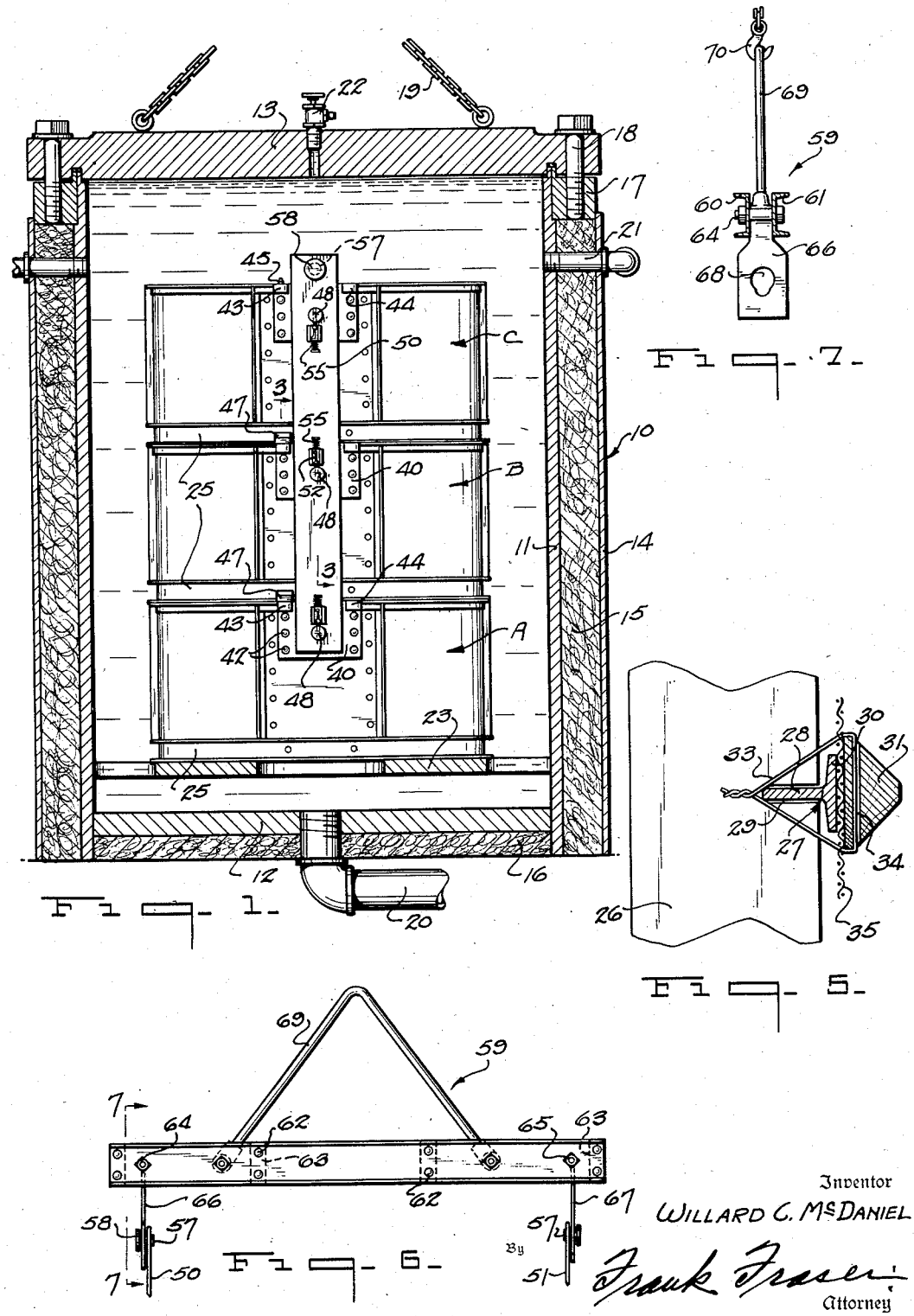

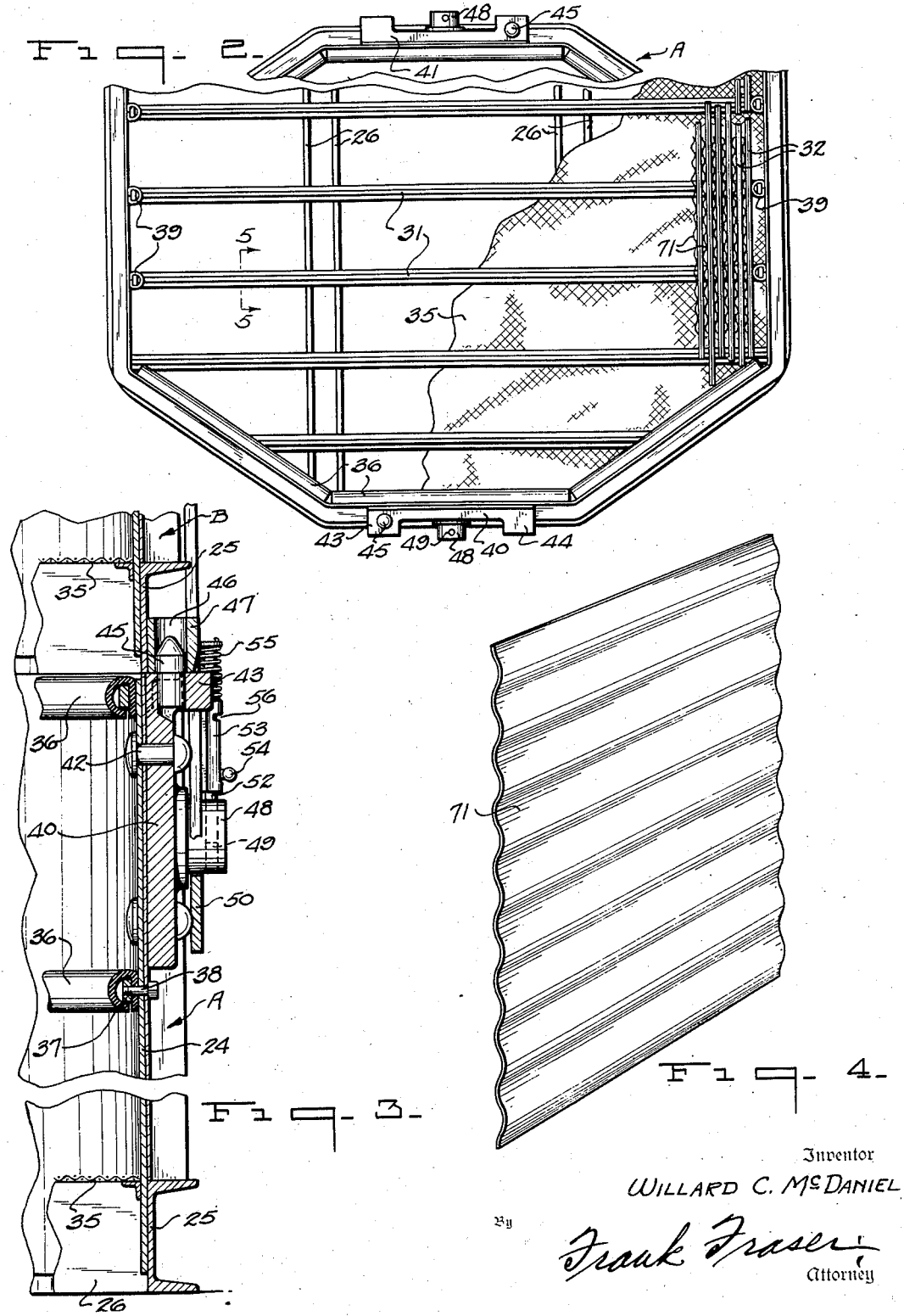

2,026,692

UNITED STATES PATENT OFFICE 2,026,692

PRESSING APPARATUS

Willard C. McDaniel, Toledo, Ohio, assignor to Libbey-Owens-Ford Glass Company, Toledo, Ohio, a corporation of Ohio Application May 31, 1932, Serial No. 614,469

11 Claims. (Cl. 18—17)

The present invention relates broadly to improvements in pressing apparatus and more particularly to apparatus of this character especially designed for use in the manufacture of laminated or safety glass, although it is of course not restricted thereto.

Laminated or safety glass ordinarily comprises two or more sheets of glass and one or more interposed sheets of non-brittle material bonded to the glass sheets to produce a composite structure. In the production of this type of glass, the surfaces of the glass sheets and/or the sheet of non-brittle material to be joined are first treated in the desired manner with a suitable adhesive or bond-inducing medium, after which the several sheets are arranged in properly assembled relationship to form a "sandwich" and subsequently united by the application of heat and pressure. According to one method of compositing the several laminations, the sandwich is submerged unprotected within a bath of fluid contained in an autoclave, and there subjected to the combined action of heat and pressure, the said fluid coming into direct contact with the sandwich so as to effect a uniform application of heat and pressure throughout from all sides thereof, whereby to cause a bonding together of the several laminations.

An important object of this invention resides in the provision of novel and improved means for supporting the "sandwiches" or laminated sheets within the autoclave during the pressing operation and for maintaining the individual laminated sheets spaced from one another in such a manner as to permit the passage of the fluid under pressure therebetween.

Another object of the invention resides in the provision of means for holding the laminated sheets within the autoclave, including a plurality of tubs or containers supported one upon the other in superimposed relation, together with means for detachably connecting said containers together so that they may be placed within the autoclave and removed therefrom as a unit.

Other objects and advantages of the invention will become more apparent during the course of the following description when taken in connection with the accompanying drawings.

In the drawings forming a part of this application and wherein like numerals are employed to designate like parts throughout the same.

Fig. 1 is a vertical sectional view through an autoclave showing in elevation the containers provided by the present invention for holding the laminated sheets, Fig. 2 is a plan view of a portion of one of the containers, Fig. 3 is a vertical section taken substantially on line 3—3 of Fig. 1, Fig. 4 is a perspective view of one of the spacers for the laminated sheets, Fig. 5 is a detail section taken substantially on line 5—5 of Fig. 2, Fig. 6 is a side elevation of the hanger used for placing the containers within the autoclave and for removing the same therefrom, and Fig. 7 is a section taken on line 7—7 of Fig. 6.

Referring now to the drawings, and particularly to Fig. 1, there is illustrated an autoclave designated in its entirety by the numeral 10 and including a vertical cylindrical side wall 11, a bottom 12 and a removable top 13. Surrounding the side wall 11 and spaced therefrom is an outer cylindrical wall or shell 14 and interposed between the said inner and outer walls 11 and 14 is a suitable insulating material 15. If desired, suitable insulation 16 may also be provided beneath the bottom 12.

Surrounding the side wall 11 adjacent the upper end thereof is a ring 17 adapted to support the top 13 and to which the said top is removably secured by a plurality of bolts 18. In order to assist in the removal and replacement of the top 13, chains 19 are attached thereto and may be engaged by the grapple hook of a suitable hoisting apparatus or crane (not shown).

The autoclave 10 is adapted to contain a suitable fluid under pressure which acts as the pressing medium, and this fluid may be introduced thereinto through the conduit 20. In the event it is desired to maintain the pressing fluid in constant circulation, it may be passed from the autoclave through conduits 21 arranged in the same circuit with the conduit 20. The top 13 may be provided with a valve 22, and when the pressing fluid is being pumped into the autoclave, this valve is open and is left open until the fluid starts to issue therefrom, at which time the same is closed and the desired pressure built up within the autoclave. Any suitable means may be provided for heating the pressing fluid and for maintaining the same in circulation.

The novel and improved means herein provided for holding the laminated sheets within the autoclave during the pressing operation includes a plurality of containers or tubs A, B and C respectively supported one upon the other in superimposed relation and being in turn supported within the autoclave upon a sub-bottom 23 spaced from bottom 12 and having a plurality of openings therein through which the pressing fluid can pass upwardly into the tubs and also into the upper portion of the autoclave. While three tubs have been herein disclosed, it will be appreciated that one or any desired number may be used.

The tubs A, B and C may be either round, square, rectangular or of any other desired shape such as octagonal as shown in Fig. 2. Each tub comprises in its construction a vertical continuous side wall 24, and encircling this wall and secured thereto adjacent its lower end is a channel beam 25, said channel beam being stood on edge and preferably projecting slightly beneath the bottom of wall 24. The bottom of the tub is made up of a plurality of pairs of spaced parallel cross members 26 and a plurality of spaced parallel longitudinally extending T-shaped members 27 (Fig. 5). The vertically disposed portions 28 of the T-shaped members 27 are received within notches 29 in cross members 26, while extending longitudinally of the T-shaped members and supported upon the horizontal portions 30 thereof are the wooden strips 31 upon which the laminated sheets 32 (Fig. 2) are adapted to be stood on edge. These wooden strips may be secured to the T-shaped members at a plurality of spaced points throughout their length by wires 33 which pass through transverse openings 34 in the wooden strips and tie around the T-shaped members 27 as shown in Fig. 5. Interposed between the bottoms of the wooden strips 31 and the horizontal portions 30 of T-shaped members 27 is a wire mesh 35 provided to prevent any glass from falling downwardly from one tub into the tub or tubs therebeneath while, at the same time, permitting the circulation of the pressing fluid therethrough.

In order to protect the side edges of the laminated sheets 32 when arranged within the tubs A, B and C, there may be provided inside each tub a plurality of horizontally arranged cushion members 36 preferably of rubber or some other suitable material and secured in place by the strips 37 and bolts 38. Similar cushion members 39 may be vertically arranged at opposite sides of each tub and against which the laminated sheets are adapted to rest as best shown in Fig. 2.

Each tub A, B and C is also provided at opposite sides thereof with the relatively thick rectangular plates 40 and 41 respectively, said plates being disposed outwardly of the tub and secured to the side wall 24 thereof by bolts, rivets or the like 42. Each plate 40 is provided at its upper end and at opposite sides thereof with the outwardly projecting ears 43 and 44, and carried by one of said ears is a vertical pin 45 adapted to be received within an opening 46 formed in the member 47 carried by the channel beam 25 of the next higher tub. The pins 45 are provided to facilitate the proper positioning of the tubs one upon the other so that they will be in vertical alignment. Also formed upon the outer surface of each plate 40 and 41 intermediate the upper and lower ends thereof is an outwardly projecting boss 48 having a vertical opening 49 therethrough, and when the tubs are arranged in proper superimposed position, the bosses 48 of the several tubs will be in vertical alignment with one another.

In order to provide for the placing of the tubs A, B, and C simultaneously or as a unit into the autoclave 10 and their subsequent removal therefrom, the following apparatus may be employed: Thus, there is provided a pair of elongated lifting plates 50 and 51 respectively (Fig. 6) which are adapted to be associated with the bosses 48 at opposite sides of the tubs. Each plate 50 and 51 is formed with a plurality of vertically spaced openings, one being provided for each boss 48 so that the said plate may be fitted over the bosses as shown in Figs. 1 and 3. Carried by each plate are a plurality of spring pressed bolts 52, one being provided for each boss 48 and adapted to be received within the opening 49 thereof. Each bolt 52 is slidable vertically within a sleeve 53 by means of a finger piece 54. The bolt is normally urged outwardly by a spring 55 but may be retracted against the action of the spring by grasping the finger piece 54 and may also be maintained in retracted position by turning the bolt so that the finger piece thereof will be received within the lateral slot 56 in a sleeve 53. Carried at the upper end of each plate 50 and 51 is an outwardly projecting pin 57 having an enlarged head 58 formed at its outer end.

After the tubs A, B and C have been filled with the laminated sheets 32 and it is desired to place them within the autoclave 10, the said tubs are first positioned one upon the other, after which the plates 50 and 51 are associated with the tubs in the manner above described. In other words, the spring pressed bolts 52 are first retracted to permit the lifting plates 50 and 51 to be slipped over the bosses 48, after which the bolts are released, whereupon they will be urged forwardly into the openings 49 in said bosses to securely lock the plates to the tubs.

The means for then lifting the tubs and placing them within the autoclave is best illustrated in Figs. 6 and 7 and consists of a lifting device designated in its entirety by the numeral 59. This lifting device comprises a pair of spaced parallel horizontal channel members 60 and 61 secured together at a plurality of points throughout their length by means of bolts, rivets, or the like 62 which also pass through spacing blocks 63 which maintain the channel members in properly spaced relation. Carried at the opposite ends of the I-beams 60 and 61 are the transverse pins 64 and 65 upon which are pivotally mounted the plates 66 and 67 respectively which are adapted to engage the pins 57 at the upper ends of plates 50 and 51. Each plate 66 and 67 is formed with a key-shaped opening 68. Also carried by the channel members 60 and 61 is a handle 69 which may be suspended from the grapple hook 70 of a suitable crane or hoisting apparatus.

When it is desired to lift the tubs, the lifting device is lowered so that the plates 66 and 67 may be moved into engagement with the pins 57 on plates 50 and 51. More specifically, the heads 58 of pins 57 are first received within the enlarged portions of openings 68, after which the lifting device is moved upwardly so that the pins 57 will be received within the smaller portion of the opening, and when this is done, it will be appreciated that the heads 58 will prevent the plates 66 and 67 from becoming accidentally disengaged from pins 57. After the tubs have been arranged within the autoclave, the lifting device can be readily disengaged therefrom, the cover 13 placed in position, and the pressing operation started. When it is desired to remove the tubs from the autoclave, the lifting device is engaged therewith in the manner above described.

In order to effect a uniform pressing of the laminations, it is of course essential that the pressing fluid be permitted to come into contact with the laminated sheets 32 all around so as to effect a uniform pressing from all sides thereof.

Therefore, one of the principal objects of the present invention resides in the provision of novel and improved means for maintaining the individual sandwiches spaced from one another to permit the passage of the pressing fluid therebetween. The means herein provided for this purpose consists of a corrugated sheet 61 preferably of metal, and one of these corrugated sheets is adapted to be placed between adjacent laminated sheets as clearly illustrated in Fig. 2. Furthermore, the corrugated sheets should be positioned so that the corrugations extend vertically whereby to provide vertical passages between adjacent laminated sheets for the pressing fluid.

As pointed out above, the laminated sheets 32 are adapted to be submerged unprotected within a bath of fluid contained within the autoclave, and subjected therein to the desired temperatures and pressures to form a composite sheet. However, since the sandwich is to be placed unprotected within the fluid bath, it has been found desirable, in order to obtain the best results, that the surfaces of the adjacent laminations be in more or less intimate contact with one another before being placed within the autoclave. Thus, if the laminations are not in intimate contact before their introduction into the autoclave, and without the use of any protecting means for the sandwich, it would be impossible to get the intimate contact between the surfaces in the autoclave, and furthermore, the pressing fluid would tend to creep in between the laminations, making it impossible to properly join them. It has accordingly been proposed that the sandwich, prior to being placed within the autoclave, be subjected to a preliminary or initial pressing to bring the laminations into more or less intimate contact with one another so that the desired pressure upon the sandwich within the autoclave can be obtained, and fluid prevented from creeping in between the laminations.

Although the present invention is in no way limited to any particular process or ingredients used in the manufacture of the laminated glass, yet for the purposes of illustration, the following cycle of operations may be followed:

Immerse the glass within the liquid when said liquid is at a temperature of approximately 190° F. Then after the autoclave is closed, increase the temperature of the liquid gradually to approximately 240° F. It is then preferred that the glass be held at this temperature and at a pressure of approximately 200 lbs. per square inch for about eight minutes. The temperature of the liquid is then again reduced to approximately 190° F., and of course the pressure is cut down, whereupon the glass is then in condition to be removed from the autoclave and washed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination in apparatus for producing laminated sheet glass, an autoclave within which the laminated sheets are adapted to be subjected to heat and pressure, and a container for holding the laminated sheets within said autoclave, said container comprising a vertical side wall, a plurality of spaced parallel members arranged within the container and upon which the laminated sheets are stood on edge, and a wire netting disposed beneath said parallel members and forming the bottom of said container.

2. In combination in apparatus for producing laminated sheet glass, an autoclave within which the laminated sheets are adapted to be subjected to heat and pressure, and a container for holding the laminated sheets within said autoclave, said container comprising a vertical side wall, a plurality of spaced parallel cross members arranged within the container, a plurality of spaced parallel longitudinally extending members supported by said cross members, a plurality of strips carried by said longitudinally extending members and upon which the laminated sheets are adapted to be stood on edge, means for securing said strips to said longitudinally extending members, and a wire netting disposed between said strips and longitudinally extending members and forming the bottom of said container.

3. In combination in apparatus for producing laminated sheet glass, an autoclave within which the laminated sheets are adapted to be subjected to heat and pressure, a plurality of containers for holding the laminated sheets within the autoclave, said containers being supported one upon the other, means for detachably connecting said containers together, and means for lifting the containers as a unit to place them within or remove them from the autoclave.

4. In combination in apparatus for producing laminated sheet glass, an autoclave within which the laminated sheets are adapted to be subjected to heat and pressure, a plurality of containers for holding the laminated sheets within the autoclave, said containers being supported one upon the other, means for aligning the containers and for maintaining them in proper position relative to one another, means for detachably connecting said containers together, and means for lifting the containers as a unit to place them within or remove them from the autoclave.

5. In combination in apparatus for producing laminated sheet glass, an autoclave within which the laminated sheets are adapted to be subjected to heat and pressure, a plurality of containers for holding the laminated sheets within the autoclave, said containers being supported one upon the other, means for detachably connecting the containers together including plates removably associated therewith, means for locking said plates to the containers, and means engaging the plates for lifting the containers as a unit to place them within or remove them from the autoclave.

6. In combination in apparatus for producing laminated sheet glass, an autoclave within which the laminated sheets are adapted to be subjected to heat and pressure, a plurality of containers for holding the laminated sheets within the autoclave, said containers being supported one upon the other, means for detachably connecting the containers together including plates having openings for receiving portions of the containers therethrough, means carried by the plates for locking said plates to the containers, and means engaging the plates for lifting the containers as a unit to place them within or remove them from the autoclave.

7. In combination in apparatus for producing laminated sheet glass, an autoclave within which the laminated sheets are adapted to be subjected to heat and pressure, a plurality of containers for holding the laminated sheets within the autoclave, said containers being supported one upon the other and having outwardly projecting bosses at opposite sides thereof, means for detachably connecting the containers together including plates having openings for receiving the bosses therethrough, locking bolts carried by the plates and received within openings formed in said bosses, and means engaging the plates for lifting the containers as a unit to place them within or remove them from the autoclave.

8. In combination in apparatus for producing laminated sheet glass, an autoclave within which the laminated sheets are adapted to be subjected to heat and pressure, a plurality of containers for holding the laminated sheets within the autoclave, said containers being supported one upon the other and having outwardly projecting bosses at opposite sides thereof, means for aligning the containers and for maintaining them in proper position relative to one another, means for detachably connecting the containers together including plates having openings for receiving the bosses therethrough, spring actuated locking bolts carried by the plates and received within openings formed in said bosses, and means engaging the plates for lifting the containers as a unit to place them within or remove them from the autoclave.

9. In combination in apparatus for producing laminated sheet glass, an autoclave within which the laminated sheets are adapted to be subjected to heat and pressure, and a container for holding the laminated sheets within said autoclave, said container comprising an imperforate vertical side wall, a plurality of spaced parallel, substantially rigid, horizontal supporting members arranged within the container and upon the tops of which the laminated sheets are stood on edge, and a wire netting disposed beneath said supporting members and forming the bottom of said container.

10. In combination in apparatus for producing laminated sheet glass, an autoclave within which the laminated sheets are adapted to be subjected to heat and pressure, a plurality of containers for holding the laminated sheets within said autoclave, said containers being supported directly one upon the other and each comprising an imperforate vertical side wall, a plurality of spaced parallel, substantially rigid, horizontal supporting members arranged within the container and upon the tops of which the laminated sheets are stood on edge and a wire netting disposed beneath said supporting members and forming the bottom of said container, and means carried by certain of the containers and engaging other of said containers for aligning the same and for maintaining them in proper position relative to one another.

11. In combination in apparatus for producing laminated sheet glass, an autoclave within which the laminated sheets are adapted to be subjected to heat and pressure, a plurality of containers for holding the laminated sheets within said autoclave, said containers being supported directly one upon the other and each comprising an imperforate vertical side wall, a plurality of spaced parallel, substantially rigid, horizontal supporting members arranged within the container and upon the tops of which the laminated sheets are stood on edge and a wire netting disposed beneath said supporting members and forming the bottom of said container, means carried by certain of the containers and engaging other of said containers for aligning the same and for maintaining them in proper position relative to one another, means for detachably connecting the containers together, and means for lifting the containers vertically as a unit to place them within or remove them from the autoclave.

WILLARD C. McDANIEL.